United States Patent [19]
Schmidt

[11] 3,934,735
[45] Jan. 27, 1976

[54] DAYLIGHT FILM HANDLING SYSTEM

[75] Inventor: Gunter Schmidt, Malibu, Calif.

[73] Assignee: Productron, Inc., Los Angeles, Calif.

[22] Filed: Sept. 27, 1973

[21] Appl. No.: 401,441

Related U.S. Application Data

[62] Division of Ser. No. 52,848, July 7, 1970, Pat. No. 3,790,160.

[52] U.S. Cl.................. 214/6 D; 214/301; 214/310; 221/67; 250/468; 271/18 R
[51] Int. Cl.²......................................... B65G 57/00
[58] Field of Search............. 271/18 R, 149, 61, 41, 271/62 B, 19, 8; 221/67, 90; 214/6 D, 8.5 H, 305, 310, 301; 222/81, 82, 87; 250/468–471, 480–482

[56] References Cited
UNITED STATES PATENTS

| | | | |
|---|---|---|---|
| 2,342,571 | 2/1944 | Carroll................................ | 271/167 |
| 2,925,761 | 2/1960 | Peary et al............................ | 221/67 |
| 3,075,080 | 1/1963 | Sano.................................. | 250/468 |

*Primary Examiner*—Frank E. Werner
*Assistant Examiner*—Lawrence J. Oresky
*Attorney, Agent, or Firm*—Lindenberg, Freilich, Wasserman, Rosen & Fernandez

[57] ABSTRACT

A system for enabling X-ray films, of the type primarily used in the dental and medical fields, to be handled in daylight for exposure to X-rays. The system utilizes identical film sheets emulsion coated on one or both faces, each sheet having a notch, displaced from the sheet center line, formed in one edge thereof. A stack of sheets is packed in an opaque envelope with the sheets being alternated so that all of the notches lie along a common stack edge arranged in two parallel rows, the notches in adjacent sheets lying in different rows. The system includes a light tight dispenser which receives the envelope and is capable of being operated to strip the envelope from the film sheet stack. The dispenser includes a pair of rotatable selector cams, each aligned with a different row of notches. A spring mounted back-up plate urges the film sheet stack against the selector cams with the two selector cams respectively bearing against notched and unnotched portions of the top sheet. Means are provided for alternately rotating the two cams so as to successively release the top sheet from the stack into a cassette removably engaged with the dispenser. The cassette includes parallel screens normally spring urged together in light tight relationship when disengaged from the dispenser. Engagement of the cassette with the dispenser in light tight relationship urges the screen plates apart to enable the released film sheet to fall therebetween. The cassette in turn operatively cooperates with a processor to enable the film sheet therein to be transferred to the processor.

8 Claims, 15 Drawing Figures

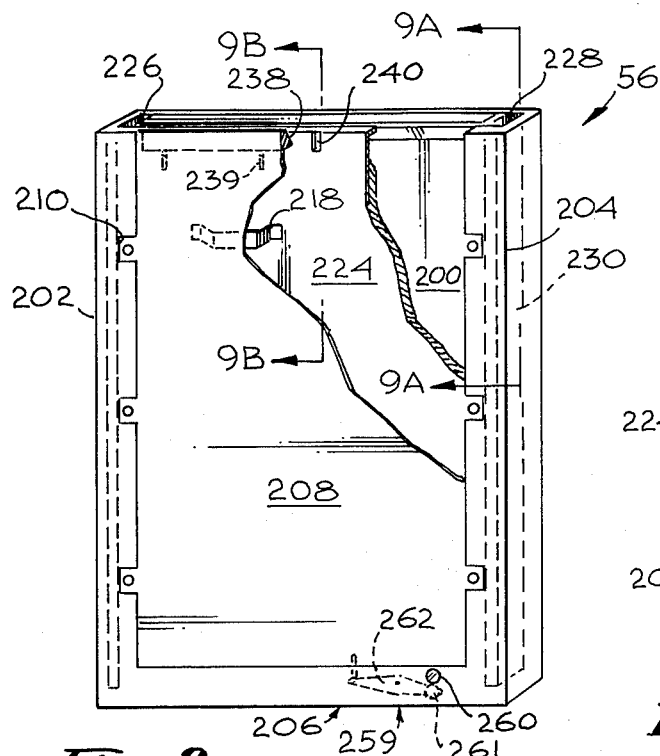
Fig. 8
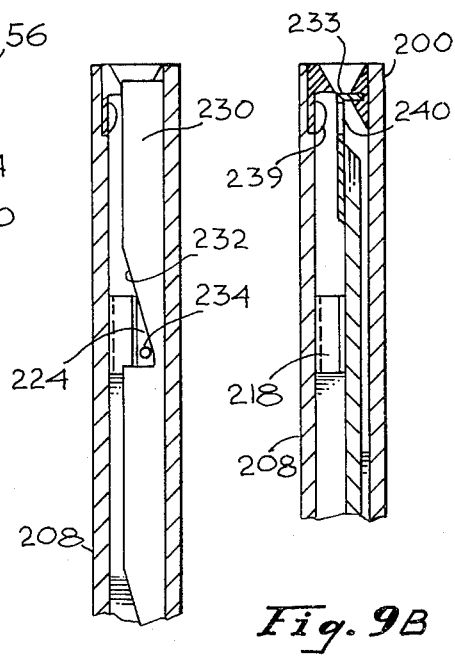
Fig. 9A
Fig. 9B
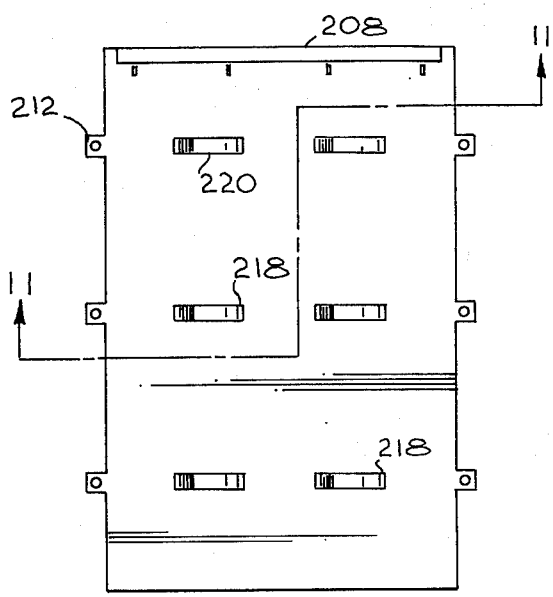
Fig. 10
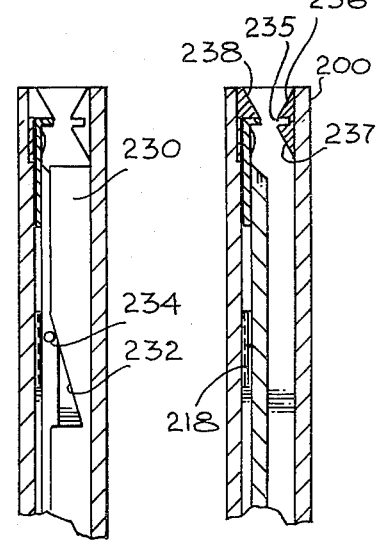
Fig. 9C    Fig. 9D
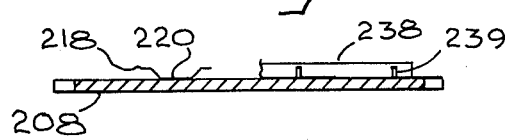
Fig. 11

DAYLIGHT FILM HANDLING SYSTEM

This is a division of application Ser. No. 52,848, filed July 7, 1970, now U.S. Pat. No. 3,790,160 which issued Feb. 5, 1974.

BACKGROUND OF THE INVENTION

The invention relates generally to a film handling system particularly useful for enabling the daylight handling of X-ray film sheets of the type primarily used in the dental, medical and industrial fields.

In the conventional use of X-ray films, as by dental and medical technicians, an X-ray film sheet is normally loaded into a cassette in a darkroom, exposed with the patient, and then again taken into the darkroom for removal from the cassette for processing. The necessity of darkroom handling of the X-ray film is inconvenient, time-consuming, and costly.

OBJECTS AND SUMMARY OF THE INVENTION

An object of the present invention is to provide a film handling system which enables a film sheet to be loaded into a cassette and transferred from the cassette to a processor in daylight without inadvertently exposing the film.

Briefly, in accordance with the preferred embodiment of the present ivention, standard X-ray film sheets are all notched on one edge prior to packaging in a light tight envelope. The notches are all spaced from a center line normal to the edge so that when a plurality of sheets are stacked with the orientation of successive sheets being alternated, the notches lie in two rows all along a common edge of the stack. Thus, in a stack of one hundred sheets for example, the fifty odd sheets will have notches lying in one row, while the 50 even sheets will have notches lying in the other row. The stack of sheets is packed in a light tight envelope.

In accordance with a significant feature of the present invention, a light tight dispenser is provided for storing the film sheet stack. The dispenser is capable of being operated to strip the envelope from the stack and to then dispense one sheet at a time from the stack.

In accordance with a further significant aspect of the invention, sheets are dispensed one at a time by alternately rotating a pair of film selector cams adapted to bear against the stack in alignment with the two rows of notches to thus free the top sheet from the stack when one cam moves out of engagement therewith and the other cam moves into alignment with the notch thereof.

In accordance with still a further aspect of the invention, a removable cassette is provided for cooperating with the dispenser to enable it to receive a film sheet released from the dispenser without exposing the film sheet to light. Preferably, operation of the film selector cams is prevented unless the cassette is in proper position to receive a dispensed film sheet. In accordance with another feature of the invention, means are provided for indicating when a film sheet is dispensed from the dispenser and when a film sheet is present in the cassette.

In accordance with a still further aspect of the invention, a processor is provided for operatively cooperating with the cassette to enable a film sheet to be easily transferred from the cassette to the processor without exposing it to ambient light.

The novel features of the invention are set forth with particularity in the appended claims. The invention will be best understood from the following description when read in conjunction with the accompanying drawings.

BRIEF DESCRIPTION OF THE DRAWINGS.

FIG. 8 is an isometric view partially broken away illustrating a film X-ray cassette in accordance with the present invention;

FIG. 9A is an enlarged sectional view taken substantially along the plane 9A—9A of FIG. 8 illustrating the position of a spacer plate when the screens of the cassette are closed;

FIG. 9B is an enlarged sectional view taken substantially along the plane 9B—9B of FIG. 8 illustrating the relationship of the screen plates when the cassette is closed;

FIG. 9C is an enlarged sectional view corresponding to FIG. 9A illustrating the position of the spacer plate when the cassette is engaged with the dispenser pins to thus open the cassette and space the screen plates from one another;

FIG. 9D is a sectional view corresponding to FIG. 9B illustrating the cassette screen plates spaced apart from one another;

FIG. 10 is a plan view of a cassette spring cover plate in accordance with the present invention;

FIG. 11 is a sectional view taken substantially along the plane 11—11 of FIG. 10.

DESCRIPTION OF THE PREFERRED EMBODIMENTS

Figure 1:
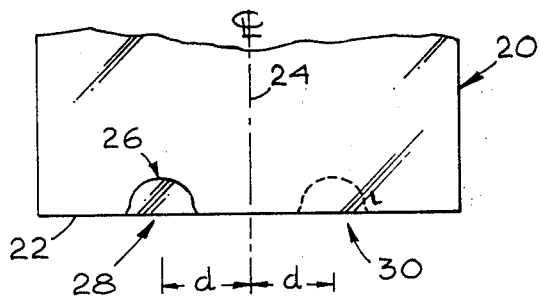
FIG. 1 is a fragmentary plan view partially illustrating a stack of X-ray film sheets notched in accordance with the present invention.

Attention is now called to FIG. 1 which constitutes a fragmentary plan view showing the bottom edge of a stack of rectangular X-ray film sheets notched in accordance with the present invention. More particularly, in the preferred embodiment of the present invention, all of the film sheets 20 are notched along a common stack edge 22 with the notches being spaced from a center line 24 extending normal to the edge 22. All of the sheets 20 are notched identically, i.e., with a notch 26 being formed in the edge 22 at a certain spacing, $d$, from the center line 24. The film sheets 20 are stacked with the orientation of successive sheets being alternated so that the notches 26 all lie along a common stack edge 22 but arranged in two rows 28 and 30 equally spaced from the center line 24. Thus, in a stack of one hundred film sheets, for example, the 50 odd sheets in the stack will have a notch 26 aligned with the row of notches 28. The fifty even sheets will each have a notch 26 aligned with the row of notches 30.

Figure 2:
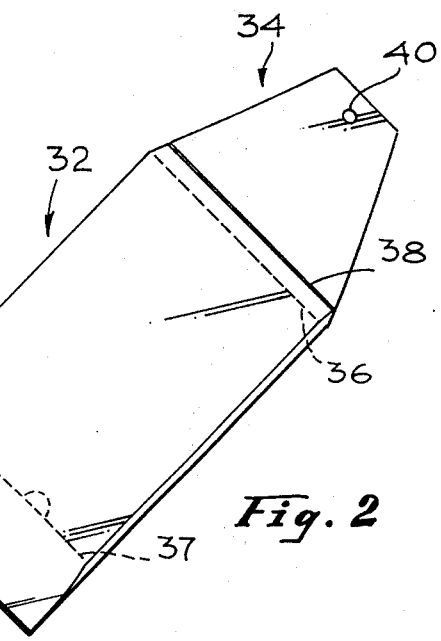
FIG. 2 is an isometric view of a film package in accordance with the present invention.

In accordance with the present invention, a stack of film sheets, notched as shown in FIG. 1 is inserted into an opaque envelope 32 as shown in FIG. 2. Preferably, the envelope 32 is formed of opaque black plastic material and has a length exceeding the length of the film sheets 20. More particularly, the envelope 32 is preferably made sufficiently long so that its leading and trailing ends 34 and 35 can loosely extend beyond the leading and trailing edges 36 and 37 of the film sheet stack when the stack is contained within the envelope. The envelope is preferably heat sealed along line 38 and its bottom edge 39. A hole 40 is provided in the leading end 34 of the envelope and the envelope is preferably sealed around the hole 40.

Figure 3:
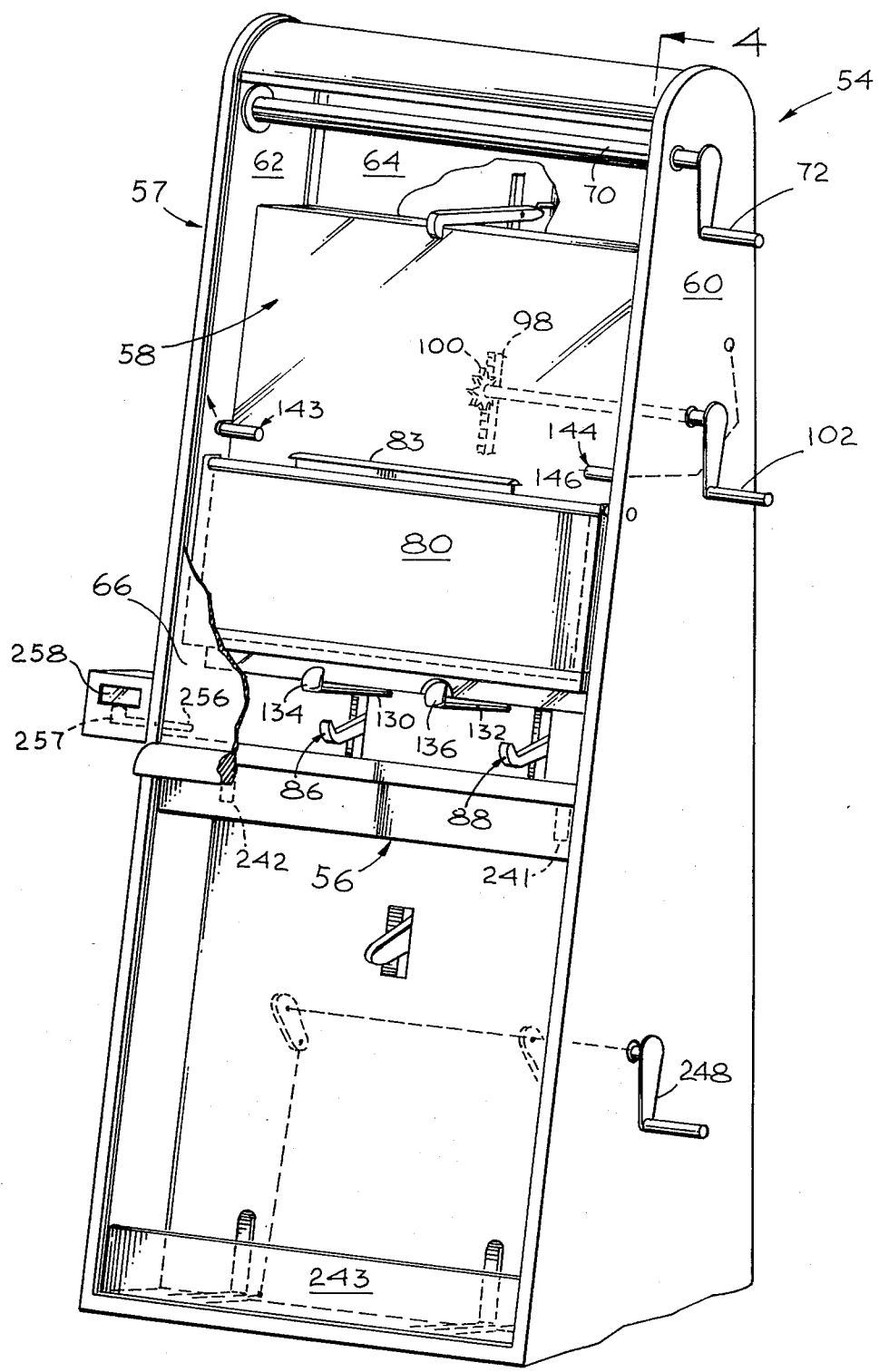
FIG. 3 is an isometric view of a dispenser apparatus constructed in accordance with the present invention.

Attention is now called to FIG. 3 which illustrates a dispenser, particularly adapted to function with the specially packaged film sheets shown in FIGS. 1 and 2, for dispensing film sheets one at a time, into a cassette in daylight without inadvertently exposing the film sheets to light. More particularly, a dispenser 54, as shown in FIG. 3, is provided in accordance with the present invention for the purpose of initially stripping the envelope 32 from the stack of film sheets contained therein and to thereafter dispense one sheet at a time from the stack into a cassette adapted to be operatively supported beneath the dispenser exit opening 56.

The dispenser 54 is comprised of a housing 57 having a film package compartment 58 defined therein between side walls 60 and 62, and between back wall 64 and slide door 66. The door 66 is provided to permit access to the film package compartment and to prevent light from seeping therein when the door is closed. The plane of the door 66 is spaced sufficiently from the back wall 64 to contain the film sheet stack therebetween.

A bar 70 is supported within the housing 54 between side walls 60 and 62 and close to the top of the housing 57. The bar is mounted for rotation about its axis under the control of a manual crank 72 extending outwardly from the housing side wall 62. Means are provided on the bar 70 to permit the leading end of envelope 32 to be secured thereto in order to enable the envelope to be stripped from the film sheet stack. Thus, the bar 70 may be provided with a hook adapted to thread the hole 40 in the envelope or it may merely be bifurcated, as illustrated, to receive the envelope leading end between the two portions thereof. It will be appreciated that many alternative arrangements could also be employed to releasably secure the leading end 34, of the envelope 32 to the rotatable bar 70.

In order to enable the envelope 32 to be stripped from the stack of film sheets 20, a door 80 (FIG. 4) is provided carrying a manually actuatable cutting blade therein. The door 80 is hinged about axis 81 extending between side walls 60 and 62. The door 80 supports a cutting blade 82 therein mounted for reciprocal movement in the plane of the door. A handle 83 is carried on the upper edge of the cutting blade. The blade is spring urged upwardly (by means not shown), so that its lower cutting edge 85 is normally contained within the profile of the door 80. A notched cutting bar 84 is fixedly mounted between the walls 60 and 62 beneath the blade 82 cutting edge 85.

A pair of stack support bars 86, 88 are contained within the film package compartment projecting forwardly from the back wall 64. The stack support bars each terminate at their forward end in an upwardly extending flange 90.

Figures 4, 5:
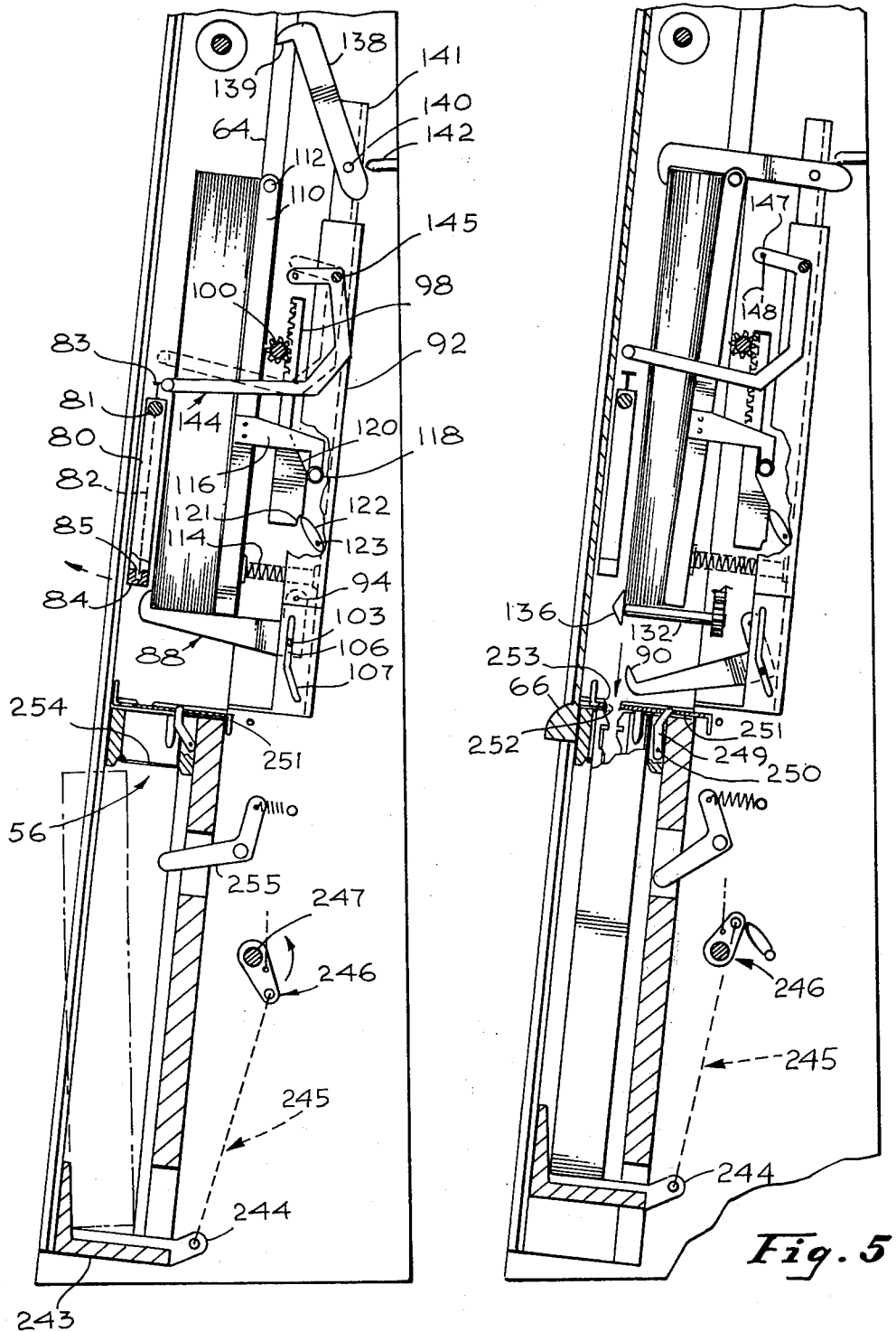
FIG. 4 is an enlarged fragmentary sectional view taken substantially along the plane 4—4 of FIG. 3 showing the film sheet stack resting on a pair of package support bars.
FIG. 5 is a sectional view similar to FIG. 4 illustrating the film stack in dispensing position resting on a pair of film selector rods.

In the use of the portion of the dispenser apparatus thus far described, with the sliding door 66 open, the leading end of the envelope 32 is passed between the portions of the bifurcated bar 70 and the bar 70 is rotated through perhaps one turn to secure the envelope thereto. The free trailing end 35 of the envelope 32 is inserted between the cutting bar 84 and the lower edge of the door 80 as shown in FIG. 4. This insertion is of course facilitated by initially swinging the door 80 out of the way about hinge axis 81. After the envelope trailing end has been inserted between the door 80 and the cutting bar 84, the door is returned to the position shown in FIG. 4. The envelope trailing end is then cut by manually forcing the cutting bar downwardly. The sliding door 66 is then closed to light seal the film package compartment. Rotation of the crank 72 then pulls the envelope 32 vertically upward stripping it from the film sheet stack.

The stack support bars 86 and 88 are pivotally secured at their rear ends to a channel member 92 for rotation about spindles 94 carried by the channel member. The channel member 92 is mounted for linear vertical movement and has a rack 98 mechanically secured thereto. The rack 98 is engaged with a pinion 100 which is operatively coupled to crank 102 (FIG. 3) extending out of the housing. Rotation of the crank 102 rotates the pinion 100 to in turn move the rack 98 therepast to thus slide the channel member 92 downwardly from the position shown in FIG. 4. Each of the stack support bars has a follower pin 103 secured thereto. Each follower pin extends through a slot 104 formed in a plate 105 fixedly mounted in the housing. The slot 104 is comprised of a substantially vertical portion 106 and a rearwardly directed portion 107. With the channel member 92 in its upper position shown in FIG. 4, the follower pin 103 will be accommodated in slot portion 106 and as a consequence, the bars 86 and 88 will extend forwardly in a substantially horizontal plane. As the channel member 92 is moved downwardly by rotating crank 102, the follower pins 103 will move into slot portion 107 so as to permit the bars 86, 88 to pivot downwardly out of the way as illustrated in FIG. 5.

With continuing reference to FIGS. 4 and 5, it is pointed out that a pressure plate 110 is provided which is supported for pivotal movement on a pair of hinge pins 112 fixedly mounted in the dispenser housing. A spring 114 bears against the back of plate 110 tending to pivot it in a clockwise direction about hinge pins 112. A rearwardly projecting arm 116 is secured to the plate 110 and carries a roller follower 118 riding on a cam surface 120. The cam surface 120 is formed on the lower end of the rack 98. When the channel member 92 and rack 98 affixed thereto are in their upper position shown in FIG. 4, then the roller follower 118 is forced rearwardly to hold the pressure plate 110 in a substantially vertical orientation. It is pointed out that a recess 121 is formed on the lower surface of the rack 98. A latch member 122 is adapted to engage the rack in the recess 121 to hold the rack in the upper position of FIG. 4. The latch is mounted on a rod 123 extending from the housing and selectively rotatable by the user to enable him to disengage the latch and rack to then permit him to lower the rack to the position of FIG. 5 by rotating crank 102.

As can be seen from FIG. 5, when the crank 102 is turned to move the rack 98 downwardly, the follower 118 will ride up the cam surface 120 to enable the spring 114 to pivot the plate 110 clockwise about hinge pin 116 to thus resiliently urge the film pressure plate 110 forwardly.

Figure 6:
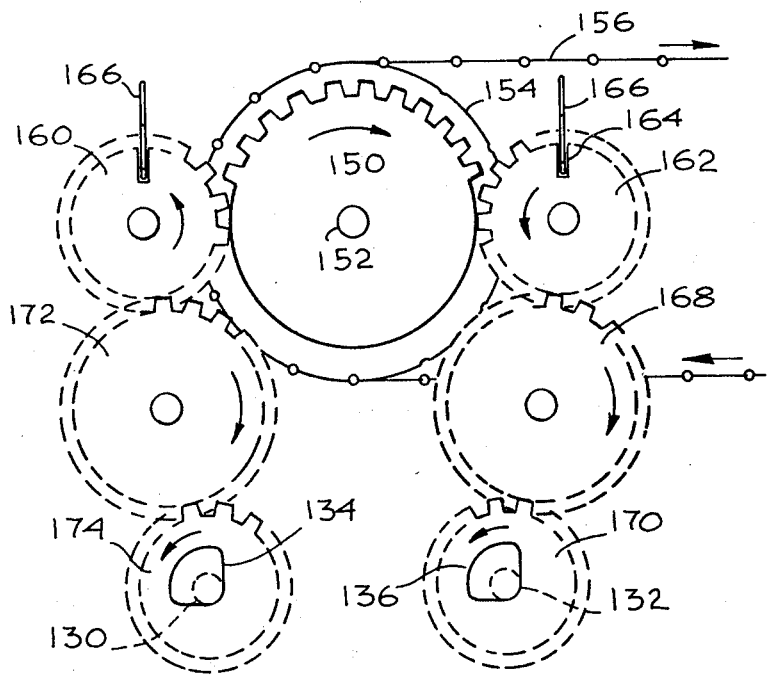
FIG. 6 is an enlarged plan view illustrating the gear train for alternately driving the film selector cam.

A pair of film selector cam rods 130 and 132 are mounted for rotation about their own axes beneath the stack support bars 86, 88 positioned as illustrated in FIG. 4. The rods 130 and 132 respectively carry cams 134 and 136 at their forward ends. As is best shown in FIG. 6, the cams 134 and 136 are essentially triangularly shaped and eccentrically mounted on the rods 130 and 132. That is, the rods connect to the cams essentially at the apex thereof with the major portion of the cam surface extending perpendicular to and beyond the rod. Prior to considering the manner in which the rods are mounted to effect the alternate rotation thereof, attention is called to FIG. 5, wherein it will be noted that when the channel member 92 is lowered from the position shown in FIG. 4, to the position shown in FIG. 5, by rotation of the crank 102, the film stack will be correspondingly lowered as the stack support bars 86 and 88 move downwardly, so that as the bars 86 and 88 move past the rods 130 and 132, the film stack will be deposited on the rods 130 and 132 as shown in FIG. 5. Concurrently with the downward movement of the stack support bars 86 and 88, the film pressure plate 110 will move forward as has been already discussed, to urge the film stack against the cams 134 and 136.

In order to facilitate the proper retention of the stack against the pressure plate 110, a plurality of arms are provided to bear against the stack. More particularly, an upper arm 138 is provided having a flanged forward end 139. The arm 138 is pivoted about pin 140 secured in a short channel member 141. The channel member 141 is mounted for linear vertical movement in the housing in alignment with channel member 92 so that when the channel member 92 is up, it holds channel member 141 up. When the channel member 92 is lowered from the position shown in FIG. 4 to the position shown in FIG. 5, channel member 141 correspondingly falls. As can be seen in FIG. 4, when the channel member 141 is in its elevated position, the end of arm 138 rearwardly of pin 140 is engaged with the stop 142 so as to hold the arm 138 pivoted clockwise. With the arm positioned as shown in FIG. 4, adequate clearance is provided to insert the film package against the pressure plate 110. When the channel member 92 is lowered, channel member 141 will be correspondingly lowered to permit the arm 138 to pivot counter clockwise so that the flanged forward end engages the front film sheet.

In addition to the arm 138, a pair of arms 143 and 144 are provided for bearing against the film sheet stack to prevent it from buckling from its own weight. More particularly, the arms 143, 144 are hinged about pins 145 fixedly mounted in the housing. The arms are provided with orthogonally oriented front terminal stubs 146, adapted to bear against the front film sheet. A rear end 147 of the arm extends beyond the hinge 145 and is coupled to a link 148. Thus, when the link 148 is raised, the arms 143, 144 are pivoted clockwise thus moving the stubs 146 out of engagement with the film sheet stack. On the other hand, when the link 148 is pulled downwardly, the arms 143, 144 are pivoted counter clockwise to engage the stubs with the film sheet stack. As will be explained in greater detail hereinafter, the link 148 is coupled to a cassette tray mechanism so that when there is no cassette in position to receive a dispensed film sheet, the stubs bear against the film sheet stack to prevent buckling. When a cassette is moved into position to accept a dispensed film sheet, the stubs 146 are moved out of engagement with the stack to permit a sheet to be released therefrom.

The film selector cam rods 130 and 132 are positioned so as to be aligned with the two rows of notches 28, 30 formed in the lower edge 22 of the film sheet stack. As will be seen hereinafter, the cams 134 and 136 will be alternately rotated by actuation of the gear train of FIG. 6. A single rotation of one of the cams will release the top sheet from the film sheet stack. That is, the top sheet in the film stack will have a notch lying either in the first or second row of notches. Assume for example, that the top sheet in the stack has a notch in alignment with cam 134. This means that cam 136 will be bearing against an unnotched portion of the sheet. When the gear train of FIG. 6 is actuated, it will rotate cam 136 to move it out of engagement with the top sheet. Inasmuch as the dimensions of the notches are larger than the corresponding dimensions of the cams 134 and 136, there will no longer be anything bearing against the top sheet and it will therefore effectively jump out from the stack with the notch therein passing over the cam 134. The cam 134 of course, will however, be bearing against the next sheet in the stack so that only one sheet at a time will be released from the stack.

In order to understand why the released top sheet effectively jumps out from the stack beyond the cam, it is pointed out that when the cams 134 and 136 are bearing against the stack of film sheets, that although there may be one hundred sheets in the stack, there only will be the thickness of 50 sheets in alignment with the notched rows. That is, cam 134 will be bearing against only 50 sheets since 50 of the sheets will be notched in alignment therewith. Similarly, cam 136 will only be bearing against 50 sheets. However, since there are twice that many sheets in the stack, the cams will somewhat buckle the sheets adjacent to the notched areas. This effect is desirable because as a consequence, when the cam bearing against the top sheet moves out of the way, the pressure release against the top sheet enables the top sheet to jump forwardly due to the inherent resiliency of the sheet.

FIG. 6 illustrates the gear train for rotating the rods 130 and 132 alternately. The gear train of FIG. 6 includes a main gear 150 having teeth extending halfway around its circumference. The main gear 150 is mounted on a shaft 152 in common with a gear 154 engaged with a sprocket chain 156. The sprocket chain is preferably driven by a motor but alternatively can be driven by a manual crank. The gear ratios are selected so that a single actuation of the drive motor or one full rotation of the manual crank causes the gears 150 and 154 to rotate through one half turn.

The teeth extending halfway around the circumference of gear 150 are engagable with the circumferential teeth on gears 160 and 162. Each of the gears 160 and 162 is provided with a keyway 164 for accommodating a spring detent 166.

When the gear 150 is rotated one half turn in a clockwise direction from the position shown in FIG. 6, the gear 162 will be rotated one full turn. During this action, the gear 160 will not be rotated. However, when the gear 150 is rotated through another half turn, the gear 160 is rotated one full turn while the gear 162 remains idle. Thus, it should be appreciated that the gears 160 and 162 will be alternately rotated as the drive motor or crank is turned. Gear 162 is coupled via gears 168 and 170 to film selector cam rod 132 which drives cam 136. Gear 160 is coupled via gears 172 and 174 to film selector cam rod 130 which carries cam 134.

Figure 7:
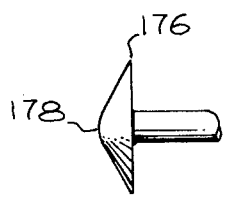
FIG. 7 is a side view of a film selector cam particularly illustrating its taper.

It is to be noted that in FIG. 7 the cams 134 and 136 are shaped so as to define a narrow leading edge to assure, in the rotation thereof, that the leading edges approach the stack outwardly of the top sheet thereof. The center portion 178 of the cam is thickened to increase the bearing engagement of the cam against the film sheet stack.

Attention is now called to FIGS. 8–11 which illustrate a film sheet cassette intended to be used in cooperative relationship with the dispenser 54 of FIG. 3. More particularly, the cassette 56 is intended to be mounted beneath the dispenser 54 so as to accept therefrom one film sheet at a time as dispensed from the dispenser. The cassette 56 is comprised of a frame having a screen plate back wall 200 as well as side walls 202 and 204 and a bottom wall 206 extending upwardly therefrom. A spring equipped cover plate 208 is provided for being received over the screen plate 200. More particularly, the walls 202 and 204 are provided with cut out portions 210 for accommodating ears 212 provided on the cover plate 208. Aligned holes are provided in both ears 212 and cut out portions 210 for receiving screws for fastening the plate 208 to the cassette frame in opposition to the back screen plate 200. A plurality of U-shaped springs 218 are secured to the cover plate 208. More particularly, the bight portion 220 of the springs are secured to the plate with the spring leg portions extending towards the screen plate 200 and adapted to bear against an intermediate screen plate 224.

A channel 226 is formed in the side wall 202 while a channel 228 is formed in the side wall 204. A spacer plate 230 is mounted within the channel 228 for sliding movement therealong. The spacer plate 230 is provided with a plurality of ramp portions 232 along the length thereof. The screen plate 224 is provided with a plurality of studs 234 extending therefrom which rest on the ramps 232. FIG. 9A illustrates the stud 234 at the bottom of the ramp 232 formed in the spacer plate 230. By sliding the spacer plate 230 downwardly, as shown in FIGS. 9A and 9C, the stud 234 will ride up the ramp 232 to thus substantially increase the spacing between plate 224 and screen plate 200.

In order to prevent light from entering the cassette, a light shield is provided comprised of a flange 233 formed on the upper edge of screen plate 224 adapted to cooperate with a slotted flexible sealing member 234 secured to the screen plate 200. That is, when the cassette is closed as shown in FIGS. 9A and 9B, the flange 233 projects into the slot 235 in the sealing member 234 to prevent light from entering therebetween. When the spacer plate 230 is moved downwardly to spread apart the screen plates, the flange 233 is, of course, withdrawn from the slot 235 to permit a film sheet to pass therebetween. In order to facilitate the entry and exit of a film sheet into and from the cassette, the edge surfaces 236, 237 of the sealing member 234 are beveled. In addition, a bevel member 238 is provided adjacent the flange 233 to facilitate entrance of a film sheet into the cassette and bevel members 239 ae provided on the opposite side of the flange for projecting through openings 240 in the screen plate 224 to facilitate exit of a film sheet from the cassette.

In accordance with the present invention, a pair of depending pins 241 and 242 (FIG. 3) are provided on the dispenser, adjacent the exit opening 56, for extending into the channels 226 and 228 to slide the spacer plates 230 and thus open the spacing between the screen plates 224 and 200.

In order to load a cassette into position to receive a dispensed film sheet, the cassette is placed in tray 243 secured to arms 244. The arms 244 are coupled to a rod 245 terminally secured to a link 246 fixedly secured to shaft 247. The shaft extends externally of the housing and is coupled to crank 248. Thus, by turning the crank 248, the link 246 will be rotated to raise the tray 243 to position a cassette therein adjacent the dispenser exit opening 56. In raising the cassette to the exit opening 56, the cassette will engage pins 241 and 242 to open the cassette and permit it to receive a dispensed film sheet, as has previously been described.

In order to assure that no light enters the dispenser housing, a light shield is provided therein consisting of a finger 249 pivoted on one end about pin 250 and engaged on the other end with a slidably mounted plate 251. As the cassette is raised, it engages the bevel surface of finger 249 and pivots it clockwise to slide the plate 251 to the right. The slide plate 251 has a slot 252 therein adapted to align with slot 253 in a fixed plate to permit a dispensed film sheet to fall therethrough. An additional light shielding hinge plate 254 is preferably mounted beneath the slide plate 251. Thus, as the cassette is raised into position for receiving a dispensed film sheet, both the cassette and dispenser light shields are automatically opened. Preferably, the raising of the cassette also closes a switch (not shown) to actuate a motor to operate the gear train of FIG. 6 to thus release a film sheet into the cassette. A spring urged bell crank 255 is preferably provided for urging the cassette forwardly to facilitate removal of the cassette from the tray.

An indicator is provided on the dispenser to indicate the dispensing of a film sheet from the stack into the cassette. In its simplest form, the indicator constitutes a lever 256 pivoted somewhere intermediate its ends. The inner end of the lever 256 is positioned so as to be engaged by the falling film sheet to thus pivot the outer end of the lever upwardly to expose a flag 257 carried thereby in an indicator window 258. The cassette is preferably also provided with an indicator 259 for indicating when a film sheet is present in the cassette even after the cassette has been removed from the dispenser. The indicator 259 includes a window 260 through which a flag 261, carried by a lever 262 can be seen. If the cassette contains a film sheet, the sheet will bear against the lever showing the flag 261 through the window 260. With the cassette removed from the dispenser, the springs 218 will lock the film sheet, thus causing the indication to be held as long as the film sheet remains in the cassette.

In the use of the film dispensing apparatus in accordance with the invention, a film package as shown in FIG. 2, is placed into the dispenser against the pressure plate 110. This is done, of course, with the channel member 92 in the raised position as shown in FIG. 4, with the arm 138 raised and out of the way and with the stack support bars 86 and 88 in position for supporting the film package. Additionally, in order to facilitate the loading of the film package into the dispenser, the cassette tray 243 is preferably raised, without the cassette therein, in order to raise the links 148 and move the stubs 146 outwardly from the pressure plate 110. The leading end of the film package envelope is then engaged with the bar 70 and the trailing end of the envelope is passed between the hinged door 80 and the cutting bar 84. The blade handle 83 is then forced downwardly to cause the blade 85 to sever the trailing end of the envelope. The housing door 66 is then closed and the crank 72 rotated to strip the envelope from the film sheet stack. Subsequently, the crank 102 is rotated to lower the channel member 92 and deliver the film sheet stack onto the cam rods 130 and 132. In so doing, the pressure plate 110 is permitted to move forwardly under the pressure of spring 114 to urge the film sheets against the cams 134 and 136. The cassette tray is lowered to move the stubs 146 into engagement with the front sheet of the stack to prevent buckling. The dispenser apparatus is then ready for dispensing a film sheet into a cassette. A user will place a cassette into the tray 243 and then raise the cassette by rotating crank 248. This action will lift the stubs 146 from the stack. Additionally, as the cassette is raised into the dispenser exit opening, the dispenser light shield and cassette light shield both open. Further, the cassette will engage a switch to actuate a drive motor to operate the gear train of FIG. 6 to thus release a single sheet from the stack which will then free fall into the open cassette therebelow.

Figure 12:
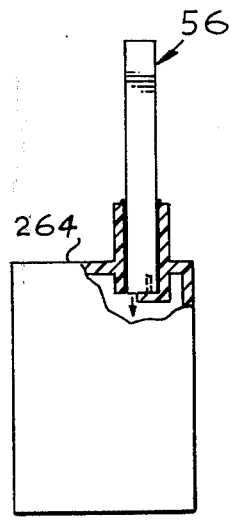
FIG. 12 is an isometric illustration showing the cassette in operative relationship with a processor.

It will be recognized that in accordance with the foregoing procedure and apparatus, a technician is able to load a film sheet into the cassette in daylight without inadvertantly exposing the film sheet to light. With the film sheet in the cassette, the film sheet can then be exposed with the patient. Thereafter, as shown in FIG. 12, the cassette can be used to release its exposed film sheet into a processor 260 in daylight without inadvertantly exposing it. That is, the processor includes upwardly projecting pins for engaging the spacer plates 230 within the cassette so as to space the screen plates 224 and 200 from one another to thereby enable the film sheet within the cassette to fall into the processor.

From the foregoing, it should be recognized that a system has been disclosed herein for enabling X-ray film sheets primarily of the kind used in the dental and medical fields to be handled exclusively in daylight thus eliminating the costly and cumbersome procedure of loading and unloading film sheets into a cassette in the darkroom only.

What is claimed is:

1. Apparatus useful for dispensing film sheets into a cassette, each sheet having a notch extending inwardly from an edge thereof, one at a time from a stack of such sheets, said stack being comprised of alternate odd and even sheets with the notch in all of said odd sheets being aligned in a first row and the notch in all of said even sheets being aligned in a second row, said apparatus comprising:
   a housing having an exit opening adapted to accommodate said stack therein;
   first cam means in said housing for engaging said stack in alignment with said first row of notches;
   second means in said housing for engaging said stack in alignment with said second row of notches;
   means for alternately disengaging said first and second cam means from said stack to successively release one sheet at a time therefrom through said exit opening;
   a cassette having an entrance opening for receiving a film sheet therethrough;
   cassette light shield means disposed in said entrance opening;
   means on said housing removably engagable with said cassette for opening said light shield means to permit a film sheet released from said exit opening to pass through said entrance opening;
   said first cam means comprising a first cam member eccentrically secured to a first rotatable rod;
   said second cam means comprising a second cam member eccentrically secured to a second rotatable rod; and
   said means for alternately disengaging said first and second cam means including means for alternately rotating said first and second rods.

2. Apparatus useful for dispensing film sheets into a cassette, each sheet having a notch extending inwardly from an edge thereof, one at a time from a stack of such sheets, said stack being comprised of alternate odd and even sheets with the notch in all of said odd sheets being aligned in a first row and the notch in all of said even sheets being aligned in a second row, said apparatus comprising:
   a housing having an exit opening adapted to accommodate said stack therein;
   first cam means in said housing for engaging said stack in alignment with said first row of notches;
   second cam means in said housing for engaging said stack in alignment with said second row of notches;
   means for alternately disengaging said first and second cam means from said stack to successively release one sheet at a time therefrom through said exit opening;
   a cassett having an entrance opening for receiving a film sheet therethrough;
   cassette light shield means disposed in said entrance opening;
   means on said housing removably engageable with said cassette for opening said light shield means to permit a film sheet released from said exit opening to pass through said entrance opening; and
   means for preventing release of said film sheets when said cassette is not engaged with said means on said housing.

3. Apparatus useful for dispensing film sheets into a cassette, each sheet having a notch extending inwardly from an edge thereof, one at a time from a stack of such sheets, said stack being comprised of alternate odd and even sheets with the notch in all of said odd sheets being aligned in a first row and the notch in all of said even sheets being aligned in a second row, said apparatus comprising:
   a housing having an exit opening adapted to accommodate said stack therein;
   first cam means in said housing for engaging said stack in alignment with said first row of notches;
   second cam means in said housing for engaging said stack in alignment with said second row of notches;
   means for alternately disengaging said first and second cam means from said stack to successively release one sheet at a time therefrom through said exit opening;
   a cassette having an entrance opening for receiving a film sheet therethrough;

cassette light shield means disposed in said entrance opening;

means on said housing removably engagable with said cassette for opening said light shield means to permit a film sheet released from said exit opening to pass through said entrance opening; and means on said processor removably engageable with said cassette for opening said cassette light shield means to permit a film sheet to be transferred from said cassette to said processor.

4. Apparatus useful for dispensing film sheets into a cassette, each sheet having a notch extending inwardly from an edge thereof, one at a time from a stack of such sheets, said stack being comprised of alternate odd and even sheets with the notch in all of said odd sheets being aligned in a first row and the notch in all of said even sheets being aligned in a second row, said apparatus comprising:

a housing having an exit opening adapted to accommodate said stack therein;

first cam means in said housing for engaging said stack in alignment with said first row of notches;

second cam means in said housing for engaging said stack in alignment with said second row of notches;

means for alternately disengaging said first and second cam means from said stack to successively release one sheet at a time therefrom through said exit opening;

dispenser light shield means disposed in said exit opening;

a cassette having a film sheet entrance opening;

cassette light shield means disposed in said entrance opening;

means for engaging said cassette and said housing with said exit and entrance openings in alignment;

said first cam means comprising a first cam member eccentrically secured to a first rotatable rod;

said second cam means comprising a second cam member eccentrically secured to a second rotatable rod; and said means for alternately disengaging said first and second cam means including means for alternately rotating said first and second rods.

5. Apparatus useful for dispensing film sheets into a cassette, each sheet having a notch extending inwardly from an edge thereof, one at a time from a stack of such sheets, said stack being comprised of alternate odd and even sheets with the notch in all of said odd sheets being aligned in a first row and the notch in all of said even sheets being aligned in a second row, said apparatus comprising:

a housing having an exit opening adapted to accommodate said stack therein;

first cam means in said housing for engaging said stack in alignment with said first row of notches;

second cam means in said housing for engaging said stack in alignment with said second row of notches;

means for alternately disengaging said first and second cam means from said stack to successively release one sheet at a time therefrom through said exit opening;

dispenser light shield means disposed in said exit opening;

a cassette having a film sheet entrance opening;

cassette light shield means disposed in said entrance opening;

means for engaging said cassette and said housing with said exit and entrance openings in alignment; and means responsive to said engagement of said cassette and housing for opening said dispenser light shield means and said cassette light shield means.

6. The apparatus of claim 5 including a plate adapted to bear against said stack; and spring means coupled to said plate for resiliently urging said stack against said first and second cam means.

7. The apparatus of claim 6 including at least one arm positioned to bear against said stack for retaining said stack against said plate.

8. The apparatus of claim 7 wherein said means for engaging said cassette and housing includes a tray adapted to hold said cassette and mounted for movement toward and away from said housing; and means responsive to said tray moving said cassette into engagement with said housing for lifting said arm from said stack.

* * * * *